United States Patent [19]

Fortune

[11] Patent Number: 4,686,737
[45] Date of Patent: Aug. 18, 1987

[54] DESOLDERING TIP ASSEMBLY

[76] Inventor: William S. Fortune, 29866 Cuthbert St., Malibu, Calif. 90265

[21] Appl. No.: 770,096

[22] Filed: Aug. 28, 1985

[51] Int. Cl.$^4$ .............................................. A47L 9/02
[52] U.S. Cl. ................................... 15/415 R; 15/341; 15/414; 228/20
[58] Field of Search ...................... 15/341, 415 R, 344, 15/414; 228/20

[56] References Cited

U.S. PATENT DOCUMENTS

| 4,204,299 | 5/1980 | Fortune | 15/415 R |
| 4,206,531 | 6/1980 | Haeuptli | 15/415 R X |
| 4,413,372 | 11/1983 | Berfield | 15/415 X |

Primary Examiner—Chris K. Moore
Attorney, Agent, or Firm—Daniel T. Anderson

[57] ABSTRACT

A hand held, spring actuated, vacuum desoldering implement is disclosed having a tubular body and a forward end cap portion thereof. The end cap has a central bore for removeably retaining a small, tubular Teflon nozzle element. The rear end of the nozzle element is formed with an increased diameter retainer collar portion to limit its forward and outward disposition within the end cap bore. The nozzle element is provided with an annular, O-ring retaining groove disposed axially contiguously to the forward end of the end cap; and an O-ring is disposed therein to retain in cooperation with its retainer collar, the nozzle element within the end cap portion. The outer diameter of the nozzle is less than that of the end cap bore whereby the nozzle element is provided with a nutational freedom of movement about its rear retaining collar connection with the end cap, this motion being cushioned and limited by compressing the O-ring laterally. A rearward, cushioned displacement of the nozzle element is also permitted by the O-ring. It is to be noted that the axial and nutational displacements are permitted while the O-ring maintains a vacuum seal between the nozzle element and the end cap.

9 Claims, 5 Drawing Figures

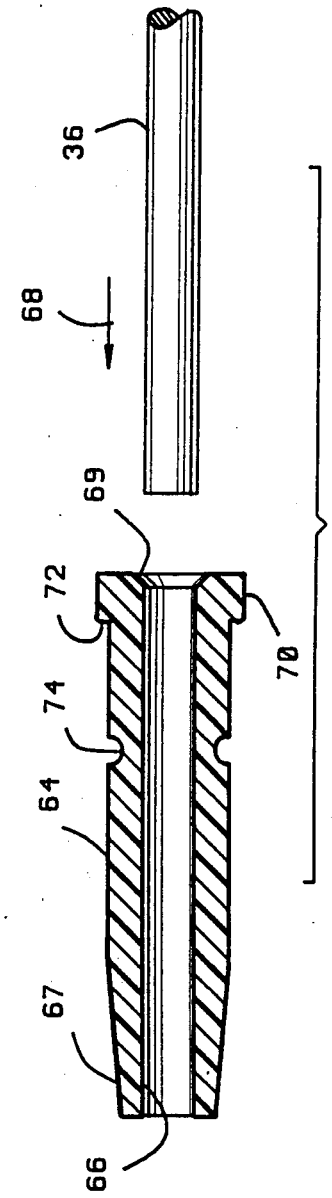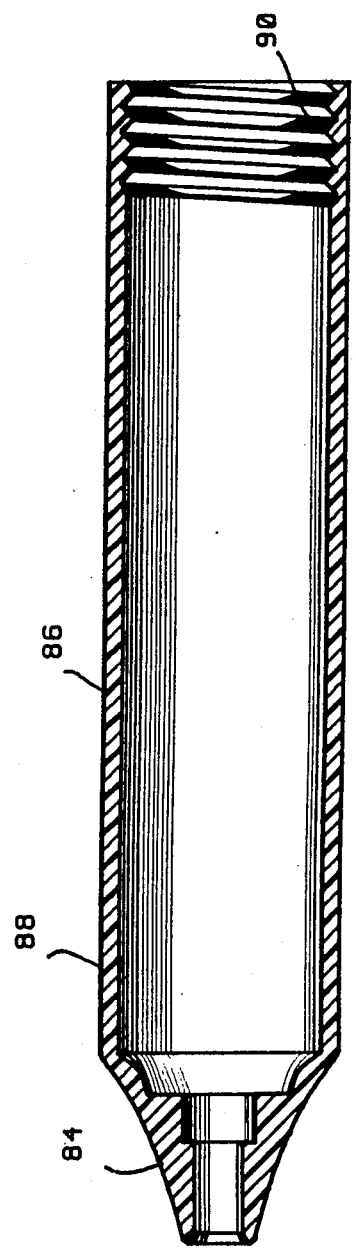

DESOLDERING TIP ASSEMBLY

BACKGROUND OF THE INVENTION

This invention relates generally to the art of desoldering implements and more specifically to a flexible, replaceable tip for a vacuum stroke, hand held, desoldering tool of the character useful in desoldering and removing components from a circuit board or the like.

Electronic repair or laboratory technicians, research engineers, and hobbiests are routinely faced with the delicate and often difficult tasks of removing or replacing an electronic component such as, for example, a resistor, capacitor, or integrated circuit chip from a printed circuit board. Typically one may not simply melt the solder and remove the soldered lead or lug: the solder tends to stay in place due to its surface tension; and, when the heat source is removed, the solder cools and refastens the element. Techniques of blowing or shaking the solder away while it is in its molten state are manifestly unsatisfactory in the environment of other exposed wiring which could suffer an electrical short from an errant particle of solder. And the problem is severely aggravated by the vulnerability of electronic components and circuit boards to mechanical or thermal damage if the desoldering process is not done quite deftly.

The successful technique of vacuum desoldering has thus been developed to aid in the desired deft removal of the molten solder. The tools for vacuum desoldering may be elaborate electrically operated vacuum pumps or may be relatively simple hand held tubular instruments containing a trigger actuated, spring energized, single stroke solder sucker. An example of a currently marketed such hand tool is disclosed in the co-pending application entitled Portable Vacuum Pump for Desoldering Purposes, Serial Number 627,067, filed July 2, 1984, by William S. Fortune and Robert E. Dallons.

Because of the exposure of the tip end of the vacuum nozzle to the hot solder and, sometimes, corrosive substances, it is highly desireable that the tip element be replaceable when worn unacceptably from its original size or shape. To maximize the service life of such a nozzle element as well as to provide other advantages, it is typically fabricated of polytetrafluoro-ethylene resin known by its trademark Teflon, a property of the Dupont company. Because Teflon is an expensive material and not readily moldable, the nozzle element is preferably made replaceable separately from the remainder of the tip assembly. A molded end cap may be provided to form the front end of the desoldering tool and retain the small, machined, tubular nozzle. Thus in replacing the worn nozzle element, minimum expense is incurred. A tip assembly of this general character is disclosed in United States Pat. No. 4,204,299 entitled Replaceable Tip for Desoldering Tools issued May 27, 1980, to William S. Fortune.

Although the referenced replaceable tip provided a significant advance over the then prior art and is still the most pertinent prior art known to the applicant, the replaceable nozzle element therein disclosed suffers certain limitations when utilized in the environment of the current art: the nozzle element is difficult to replace without damaging or destroying the end cap member, which retains it; although providing some angular, or nutational, flexibility of the nozzle with respect to the body of the tool, it is undesireably rigid in that respect; it is longitudinally rigid thereby, at times, causing damage to circuit elements from contact therewith particularly during the inherent recoil impulse suffered when a hand held, spring actuated tool is used; and maching and molding tolerances preclude a perfect air seal between the nozzle and the end cap elements causing a compromise in the vacuum stroke efficiency of the tool.

Accordingly, it is an object of the present invention to provide a desoldering tool tip assembly which is not subject to these and other disadvantages or limitations of the prior art.

It is another object to provide such a tip assembly which is readily rebuilt by very easily and inexpensively replacing a worn Teflon nozzle.

It is another object to provide such a tip assembly in which there is no significant vacuum leakage between the nozzle and its retainer cap.

It is another object to provide such a tip assembly in which the nozzle element is angularly flexible having a nutational freedom of motion about its connection to the end cap member while maintaining its vacuum seal.

It is another object to provide such a tip assembly in which the nozzle, while flexible, automatically returns to an axially aligned disposition.

It is another object to provide such a tip assembly in which the troublesome aspect of maintaining the inner bore of the nozzle clean and free of solder, flux, and other matter is significantly minimized.

It is a most important object of the invention to provide such a tip assembly in which the nozzle element is softly cushioned in all directions, including axially, whereby the probability of circuit element damage from contact with the nozzle end is greatly reduced.

SUMMARY OF THE INVENTION

Briefly, these and other objects are achieved in accordance with the structural aspects of a presently preferred example of the invention in which a cylindrical nozzle element is provided having an enlarged diameter rear end forming a retaining shoulder and having a central longitudinal bore therethrough for drawing in the molten solder during a vacuum stroke of the tool. Spaced forwardly of the retaining shoulder by an axial support separation distance, an O-ring retaining groove is formed circumferentially about the body of the nozzle element.

The nozzle is preferably machined from Teflon or a like material having good thermal stability characteristics and being self lubricating such that the adherence of soldering materials thereto is minimized. The high dielectric character of such material is generally desireable for further protection with the circuit elements; however, it is, in some applications, desireable to "load" the resin material with a carbon, or the like, substance so that the nozzle may bleed off high static electric potentials which may accumulate on the nozzle with respect to delicate circuit elements which might otherwise be damaged by the electric field ,or an arc discharge thereof.

The end cap portion of the tool is provided with a central bore to receive the nozzle element, its bore diamenter, being approximately that of the enlarged diameter rear end of the nozzle element. The forward portion of the end cap bore has a slightly reduced diameter from its tip end to a point rearwardly thereof by approximately said axial support separation distance. The circumferential shoulder formed in the end cap bore by the diameter difference limits the nozzle element from forward displacement beyond the contact of the enlarged diameter rear end of the nozzle element therewith. It is to be noted that the reduced diameter of the end cap bore is significantly larger than the diameter of the nozzle element.

A small diameter O-ring is then rolled rearwardly over the nozzle element until it snaps into the retaining groove thereof and rests snugly against the forward end of the end cap portion. Thusly, the nozzle element is retained from forward displacement by the retaining shoulders cooperation and is retained from rearward displacement by the captive O-ring retained between the two elements. The nozzle element may, however, be resiliently moved rearwardly as well as nutationally by compressing the O-ring, which may be chosen to be relatively soft for cushioning purposes as well as to provide a secure vacuum seal between end cap and the nozzle elements.

These and other features of the invention will be best understood from the following detailed descriptions of examples of the invention presented in connection with the drawing.

THE DRAWING

FIG. 1, is a side elevational view, partially cut away, of a desoldering tool incorporating an example of a tip assembly constructed in accordance with the principles of the present invention; FIG. 2, is a longitudinal sectional view of the tip assembly of the tool of FIG. 1; FIG. 3, is a longitudinal sectional view of an alternative example of a tip assembly of the present invention; FIG. 4, is a longitudinal sectional view of the tip nozzle element of the previous figures shown in its cooperative relation with the piston carried cleaning rod shown in FIG. 1; and FIG. 5, is a longitudinal sectional view of desoldering tool barrel mold-fabricated integrally with its end cap in accordance with an alternative example of the invention.

DETAILED DESCRIPTION

Figure 1:
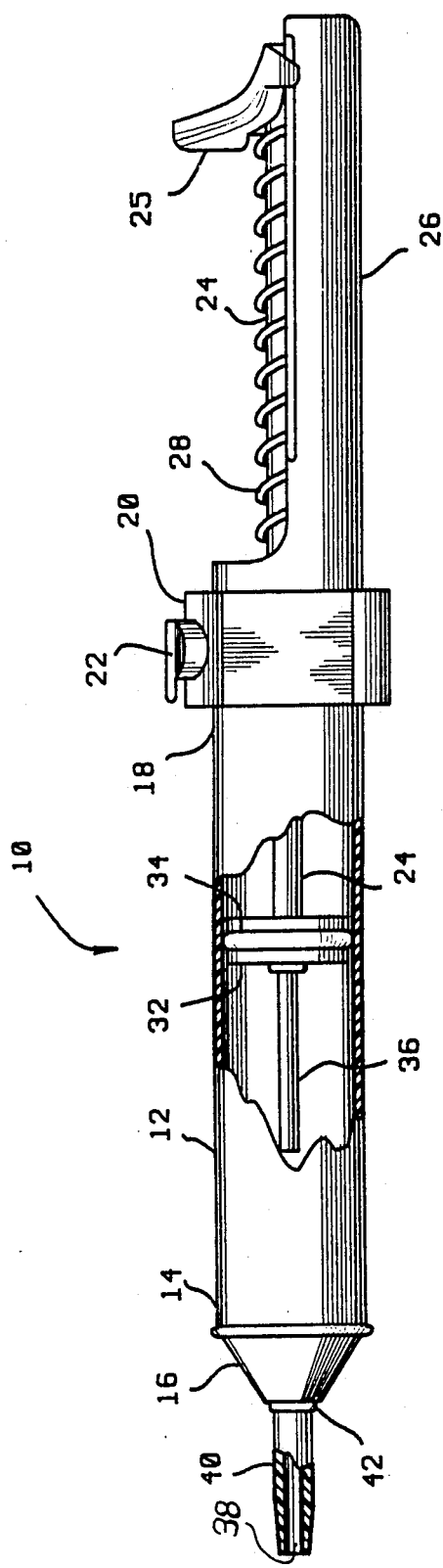

Refering to the drawing it is stressed that for purposes of brevity and clarity only an example of a desoldering instrument is illustrated. The example shown is a hand held, hand cocked, spring loaded desoldering tool, while the principles of the invention are equally well implemented in, for example, a power vacuum or air pressure or solenoid operated tool; and the scope of the appended claims is intended to include such other examples.

In FIG. 1, then, the hand held desoldering tool 10 is shown to include a cylindrical barrel 12 fitted at its forward end with, in this example, a removeable end cap 16. Its rear end 18 is essentially closed by a trigger boss 20 which, in turn, houses a spring loaded vacuum stroke actuating trigger 22. Extending rearwardly beyond the boss 20 is a hand loaded cocking shaft 24 terminated in a thumb engaging tab 25 which is slidingly retained in an operator protective guide sleeve 26. The cocking spring 28 is compressively retained about the cocking shaft 24, between the trigger boss 20 and the thumb tab 25.

Illustrated within the barrel 12 is a piston 32 carried by the forward end of the cocking shaft 24. The piston carries a sealing O-ring 34 about its circumferential periphery and a cleaning rod extension 36 which, during the cocking stroke of the shaft-piston assembly, is automatically inserted and swept axially through the bore 38 of the nozzle 40, for purposes of cleaning the bore of solder and flux, and the like, matter in preparation for the succeeding desoldering vacuum stroke. The nozzle 40 is retained within the end cap 16 removeable and flexibly sealed thereto by an O-ring 42, all as described in more detail below.

In operation, the operator, in preparation for removing molten solder from, for example, a circuit board, cocks the spring loaded tool by depressing the cocking shaft axially all the way forwardly until the trigger apparatus engages and holds it whereby the piston 32 is disposed in a cocked condition contiguously to the end cap 16. The nozzle opening is then placed against the molten solder; and the trigger 22 is actuated to cause the spring loaded piston and cocking shaft to fly rearwardly. The rapid flyback creates a high vacuum within the barrel 12 between the piston 32 and the end cap 16 causing a rapid flow of ambient air to enter the nozzle bore 38 and carry with it the molten solder.

In this rearward fly back operation, the mass of the piston - cocking shaft - cleaning rod assembly inherently causes a forwardly directed reaction recoil of the barrel and nozzle. Since the nozzle has been placed closely contiguous to the integrated circuit chip, or other such element being desoldered, its in accordance with prior art tools and practice, is vulnerable to mechanical shock damage when impacted by the nozzle tip and the attendant mass of the tool body. In accordance with the instant invention, however, likelihood of damage due to such impact is essentially eliminated by the action of the soft O-ring 42 which shock-isolates the nozzle 40 from the mass of the body of the tool 10. The slight mass of the nozzle precludes deleterious impact when it, due to the recoil, bumps the workpiece. The flexibility and shock absorption achieved by the O-ring 42 in lateral and angular as well as rearward directions further protects the work from recoil or otherwise caused impact damage as described below.

Figure 2:
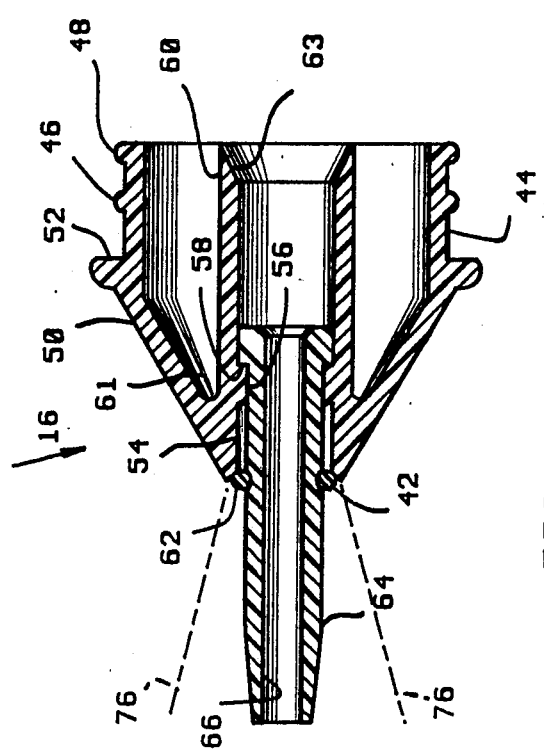

In FIG. 2, the end cap-nozzle 16 - 40 assembly is shown in sectioned detail. The molded end cap 16 includes a hollow cylindrical body portion 44 having an outer diameter approximately equal to the inner diameter of the barrel 12 into which it may be removeably press-fit for normal tool assembly and use. Annular ridges 46, 48 may be provided on the outer surface of the body portion 44 to provide a more secure retention and to provide useful manufacturing tolerances. The forward end of the cylindrical body portion 44 joins a frusto-conical portion 50 to form a retaining shoulder 52 for the forward end of the barrel 12, the outer, or base diameter of the frusto-conical portion 50 being approximately equal to the outer diameter of the barrel 12.

The forward, smaller diameter end of the frusto-conical portion 50 is terminated by a central bore 54 which extends axially for the length of the end cap 16. A reduced diameter, axially short, intermediate portion 56 forms a retaining shoulder 58. As seen, a second, inner hollow cylindrical body portion 60 is molded integrally with the end cap and is joined thereto at the inner rear central surface 60 of the frusto-conical portion 50. It is thereby cantilevered rearwardly therefrom and may be molded in a manner to be angularly flexible with respect thereto. The rear of the inner body portion 60 is formed with a diverging conically tapered transistion 63 to the central bore 54. The purpose of the tapered bore end is 1.) to facilitate the insertion of a nozzle thereinto and 2.) to funnel the forward tip of the cleaning rod 36 thereinto in the event the tool is cocked while the inner body portion 60 is deflected away from its central alignment.

The forward end of the bore 54 is also provided with a short frustoconical opening forming an O-ring seat 62. To this end, the angle of the conical section is approximately 45° and has a length of approximately one-half the toroidal thickness of the O-ring 42. This geometry of the conical seat 62 provides a vacuum seal between the nozzle 40 and the end cap 16 and permits, at the same time, a cushioned angular flexibility of the nozzle with respect to the end cap.

The nozzle 40, see also FIG. 4, is preferably machined from Teflon or a material having similar properties to form basically a cylindrical body 64 with a central bore 66 therethrough. Its outer diameter may be somewhat tapered, converging, toward its front tip end 67 to facilitate its disposition into close work spaces. Its rear end may be provided with a reamed taper 69 to facilitate the entry therein of the cleaning rod 36 during the cocking stroke of the tool as indicated by the motion arrow 68.

The remaining geometry of the nozzle 40, in this example, consists of an axially short enlarged diameter collar portion 70 disposed at the rear end of the nozzle. The juncture of the enlarged diameter collar portion 70 with the main body portion 64 forms a retaining shoulder 72 adapted to bear axially against the retaining shoulder 58 disposed in the inner bore 54 of the end cap 16. Spaced forwardly of the retaining shoulder 72 is an annular retaining groove 74 for the O-ring 42. The length of this axial spacing is chosen to cause the O-ring 42, when in place in the assembled tool, to be compressed against its seat 62 in the end cap 16 and to create an axial tension in that portion of the nozzle 40 between the engaged retaining shoulder 58, 72 and the O-ring retaining groove 74.

To assemble, or reassemble, the nozzle - end cap combination, the nozzle is inserted from the rear into the bore 54 until the retaining shoulder's 58, 72 compressively engage. Then the soft O-ring 42 is placed over the forward tip end of the nozzle 40 and rolled rearwardly thereover until it snaps into the retaining groove 74 and bears compressively against the O-ring seat 62.

In operation, the nozzle 40 may be softly, flexibly pushed rearwardly as the soft O-ring is compressed against its seat 62; and the nozzle is angularly flexible to the limits indicated by the divergent lines 76 by virtue of the sideways compression of the O-ring 42. The magnitude of soft flexure is futher increased, in this example, by the angularly flexible junction of the inner hollow cylindrical portion 60 to the inner rear of the end cap 16 at its surface 61.

It may be noted that an additional advantage of the nutational freedom of motion of the nozzle-end cap is manifest in cleaning the nozzle bore 66 with the cleaning rod 36. For reasons including the necessity of providing manufacturing tolerances, the cleaning rod diameter must be somewhat smaller than the bore 68, hence some solder and flux and the like may not be consistently removed by the cleaning stroke of the rod 36. In accordance with the advantages of the described structure, however, the nozzle may readily be flexed sideways during a few cleaning strokes to clean all of the bore 66 surface of any foreign material.

Figure 3:
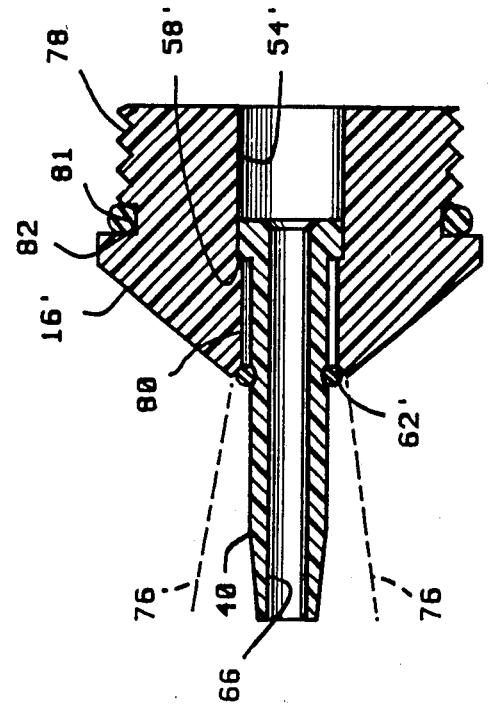

Referring to FIG. 3, an example of the invention is illustrated in which the end cap 16' is machined from metal, such as aluminum, and provided with threads 78 for removeable engagement with a barrel 12', not shown. The essential geometrical relationships of the end cap 16' may be the same as those previously described for the molded end cap 16 except that no inner hollow cylindrical body portion 60 is provided for extra flexibility. Additional flexibility may be provided, however, by causing the reduced diameter, retaining shoulder forming portion 80 to be larger than the outer diameter of the main body portion 64 of the nozzle 40. The nozzle is, accordingly, able to pivot about the engagement of its retaining shoulder 72 with the retaining shoulder 58 formed by the reduced diameter portion 80, the pivoting being permitted and cushioned and return centered by the soft O-ring 42 in engagement with the O-ring seat 62'.

To facilitate a removeable sealing assembly of the threaded metal end cap 16' with its barrel, not shown, an O-ring 81 retaining groove 82 may be provided, as shown, at the base of the retaining shoulder 52' at the forward end of the threads 78.

Referring to FIG. 5, an example of the invention is illustrated in which the end cap 84 is molded integrally with the barrel 80 of the desoldering tool. The barrel is a hollow, thin walled, cylinder 88 having, in this example, a set of threads 90 for attachment to other, cooperative apparatus such as the trigger boss as in the previously described examples or valving or other fitting if vacuum is provided externally of the cylinder 88.

The forward end of the barrel 86 is essentially closed by the frustoconical like end cap 84 which is formed with a bore 80 having a larger diameter rearward portion 54' forming a nozzle retaining shoulder 58' at their juncture. Again an O-ring seat 62' is formed at the forward end of the bore 80. The other cooperative relationships between the nozzle 16, the O-ring 42, and the end cap 84 are essentially the same as those described in connection with the discussion of FIG. 3.

The special advantages of the example of the structure of FIG. 5 are those of economy in fabricating and assemblies the tool, the barrel and end cap being a single molded piece.

There has thus been disclosed and described a desoldering tool combination in which the nozzle is flexible, inexpensive, self centering, automatically sealed, readily replaceable, more effectively cleanable and which achieves the objects and exhibits the advantages discussed above.

THE CLAIMS

1. An end cap and replaceable nozzle element combination for a hand held, vacuum stroke desoldering tool of the character having a hollow cylindrical barrel body portion, said combination comprising:
   (a) an end cap having
      (i) a frusto-conical forward surface diverging rearwardly from its front tip end,
      (ii) a rear surface, and
      (iii) a central, nozzle retaining bore axially therethrough, said bore having
         (A) a first diameter from its forward end to a point rearwardly therefrom, and
         (B) a second, larger diameter rearwardly from said point and forming thereby a nozzle element retaining and centering shoulder;
   (b) a nozzle element having
      (i) an elongate cylindrical body,
      (ii) a central, axial bore therethrough,
      (iii) an outer diameter extending from its forward portion rearwardly and being significantly less than said first diameter of said end cap bore, (iv) a rear portion having an enlarged diameter approximately equal to said second, larger diameter of said end cap bore and forming a retaining collar of the character to cooperate with said nozzle element retaining and centering shoulder of said end cap, and (v) and O-ring retaining groove displaced in the outer surface of its said elongate cylindrical body and spaced forwardly from said retaining collar; and (c) a resiliently deformable O-ring disposed in said retaining groove compressively between said nozzle element and said forward tip end of said end cap, the axial distance between said O-ring retaining groove and retaining collar of said nozzle element being approxequal to that between said forward tip end of said end cap and said nozzle element retaining and centering shoulder of said bore of said end cap whereby said O-ring is axially sealingly compressed against said forward tip end of said end cap.

2. An end cap and replaceable nozzle element combination for a hand held, vacuum stroke desoldering tool of the character having a hollow cylindrical barrel body portion, said combination comprising:

(a) an end cap having a forward, outer surface and a rear, inner surface and a central axial, nozzle retaining bore therethrough, the major length of said bore having a first diameter, (b) a nozzle element disposed within said end cap and composed of a heat resistant, non-sticking plastic material, the outer diameter of the major length of said element being significantly smaller than said first diameter of said end cap bore and having an O-ring retaining groove formed about its central portion, (c) nozzle element retaining means disposed contiguously to said rear, inner surface of said end cap for securing said nozzle element against forward displacement beyond a predetermined axial disposition with respect to said end cap; and (d) a cushioning and sealing O-ring disposed in said retaining groove in compression axially and radially against the forward end of said end cap whereby said nozzle element is provided with a self centering nutational freedom of motion about its connection with said retaining means and a cushioning against rearward displacement thereof.

3. The invention as set forth in claim 2 wherein said nozzle element retaining means comprises:

(a) an increased diameter collar portion formed integrally with and disposed contiguously to the rear end of said nozzle element, and (b) an increased diameter retaining shoulder forming portion disposed contiguously to and formed integrally with the rear end of said bore of said end cap, the diameter of said increased diameter porton or said bore being approximately equal to that of said collar portion of said nozzled element.

4. The invention as set forth in claim 2 in which the forward end of said nozzle retaining bore of said end cap is terminated in a short, outwardly and forwardly diverging opening to form a seat for said O-ring.

5. The invention as set forth in claim 2 in which said end cap forward surface is frusto-conical diverging outwardly and rearwardly from its forward tip end.

6. The invention as set forth in claim 2 in which said end cap is molded integrally with said hollow cylindrical barrel body portion.

7. The invention as set forth in claim 2 in which said end cap comprises a rearwardly extending reduced diameter portion of the character to be removeably press fit into the forward end of said hollow cylindrical barrel body portion.

8. The invention as set forth in claim 2 in which said end cap comprises a rearwardly extending reduced diameter portion having external threads formed herein for threaded insertion into the forward end of said hollow cylindrical barrel body portion.

9. A nozzle element replaceable in the bore of the front end cap of a hand held, vacuum stroke desoldering tool of the character having a hollow cylindrical barrel body and in which the end cap has a forward, outer surface and a rear inner surface and a central axial, nozzle retaining bore therethrough having a first diameter for its major, forward portion and an enlarged, second diameter rear portion contiguous to the end cap inner surface, the juncture of the first and second diameters forming a nozzle retaining shoulder, said nozzle having:

(i) an elongate cylindrical body fabricated of a non-sticking, heat resistant plastic material and having a central bore therethrough for the passage of removed solder into the interior of the desoldering tool, (ii) an outer diameter extending from its forward end rearwardly and being significantly less than the first diameter of the nozzle retaining bore to allow damage-avoiding pivoting of said nozzle element within said bone, (iii) a rear retaining collar forming portion having an enlarged diameter approximately equal to the second, enlarged diameter of said nozzle retaining bore, and (iv) an O-ring retaining groove formed circumferentially about the outer surface of said elongate body forwardly from said retaining collar forming portion.

* * * * *